US012328694B2

(12) United States Patent
Liu et al.

(10) Patent No.: US 12,328,694 B2
(45) Date of Patent: Jun. 10, 2025

(54) SYSTEMS AND METHODS FOR DETERMINING A RECEPTION CONFIGURATION OF DOWNLINK CONTROL

(71) Applicant: ZTE Corporation, Guangdong (CN)

(72) Inventors: Liping Liu, Shenzhen (CN); Xing Liu, Shenzhen (CN); Xianghui Han, Shenzhen (CN); Peng Hao, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 270 days.

(21) Appl. No.: 18/100,007

(22) Filed: Jan. 23, 2023

(65) Prior Publication Data

US 2023/0164716 A1 May 25, 2023

Related U.S. Application Data

(63) Continuation of application No. PCT/CN2020/020612, filed on Oct. 13, 2020.

(51) Int. Cl.
H04W 56/00 (2009.01)

(52) U.S. Cl.
CPC ..... H04W 56/0015 (2013.01); H04W 56/004 (2013.01)

(58) Field of Classification Search
CPC ............ H04W 56/0015; H04W 56/004; H04L 5/0051
See application file for complete search history.

(56) References Cited

U.S. PATENT DOCUMENTS

| 2019/0037481 | A1 | 1/2019 | Zhang et al. |
| 2019/0222340 | A1 | 7/2019 | Kaikkonen et al. |
| 2019/0246410 | A1* | 8/2019 | Zhang ............... H04W 72/0446 |
| 2020/0022068 | A1* | 1/2020 | Ly ........................ H04J 11/0073 |
| 2020/0280940 | A1* | 9/2020 | Kim ..................... H04J 11/0086 |
| 2021/0014805 | A1 | 1/2021 | Tang |
| 2021/0243680 | A1 | 8/2021 | Harada et al. |
| 2022/0022145 | A1* | 1/2022 | Raghavan ............. H04W 24/08 |

(Continued)

FOREIGN PATENT DOCUMENTS

| CN | 110035493 A | 7/2019 |
| CN | 111344990 A | 6/2020 |

(Continued)

OTHER PUBLICATIONS

Synchronization Signal Block Mapping Across Different Frequencies, Raghavan (Year: 2020).*

(Continued)

Primary Examiner — Ian N Moore
Assistant Examiner — Latresa A McCallum
(74) Attorney, Agent, or Firm — Foley & Lardner LLP

(57) ABSTRACT

A system and method for wireless communications are disclosed herein. Example implementations include a wireless communication method of receiving first system information in a Synchronization Signal/Physical Broadcast Channel (PBCH) Block (SSB), where the first system information indicates an offset, and at least two value ranges are defined for the offset, and determining reception configuration of downlink control of second system information according to one of the at least two value ranges.

20 Claims, 9 Drawing Sheets

(56) References Cited

U.S. PATENT DOCUMENTS

| | | | |
|---|---|---|---|
| 2022/0158702 A1 | 5/2022 | Nallampatti Ekambaram et al. | |
| 2022/0210720 A1* | 6/2022 | Harada | H04L 27/2692 |
| 2023/0071890 A1* | 3/2023 | Jiang | H04W 16/14 |

FOREIGN PATENT DOCUMENTS

| | | | |
|---|---|---|---|
| CN | 111492703 A | 8/2020 | |
| WO | WO-2020/065862 A1 | 4/2020 | |
| WO | WO-2020/167232 A1 | 8/2020 | |
| WO | WO-2020/183625 A1 | 9/2020 | |

OTHER PUBLICATIONS

First Office Action for CN Appl. No. 202080105479.9, dated Jul. 27, 2024 (with English translation, 13 pages).

Moderator (ZTE Corporation), "Feature lead summary#2 on coverage enhancement for channels other than PUSCH and PUCCH", 3GPP TSG RAN WG1 #103-e, R1-2009805, Nov. 13, 2020, e-Meeting (119 pages).

International Search Report and Written Opinion for PCT Appl. No. PCT/CN2020/120612, mailed Jun. 25, 2021 (9 pages).

Samsung Electronics: "Corrections to handing posSIB-MappingInfo in SIB1" 3GPP TSG-RAN2 Meeting # 111 Electronic; R2- 2008273; Aug. 28, 2020; e-meeting (5 pages).

\* cited by examiner

SYSTEMS AND METHODS FOR DETERMINING A RECEPTION CONFIGURATION OF DOWNLINK CONTROL

CROSS-REFERENCE TO RELATED APPLICATION

This application claims the benefit of priority under 35 U.S.C. § 120 as a continuation of PCT Patent Application No. PCT/CN2020/120612, filed on Oct. 13, 2020, the disclosure of which is incorporated herein by reference in its entirety.

TECHNICAL FIELD

The disclosure relates generally to wireless communications and, more particularly, to systems and methods for signal and channel transmission.

BACKGROUND

Wireless communication service covers more and more applications. Conventional services do not align on communication frequency bands. For some systems, bands are relatively high, the loss is greater in propagation, and similarly the coverage radius is relatively small under the same power. To align coverage of next-generation communication services with conventions systems, a technological solution for enhanced coverage in a new generation of mobile communication systems is desired.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

Example implementations include a wireless communication method of receiving first system information in a Synchronization Signal/Physical Broadcast Channel (PBCH) Block (SSB), where the first system information indicates an offset, and at least two value ranges are defined for the offset, and determining reception configuration of downlink control of second system information according to one of the at least two value ranges.

In some implementations, the first system information is carried on a PBCH of the SSB, the offset is indicated by an $k_{SSB}$ value, the downlink control includes a Physical Downlink Control Channel (PDCCH), and the second system information includes System Information Block 1 (SIB1). In some implementations, the at least two value ranges include a first value range indicating a subcarrier offset of the SSB, a second value range indicating a frequency location of another SSB associated with the second system information, and a third value range indicating an undefined frequency location of the another SSB associated with the second system information.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Figure 1:
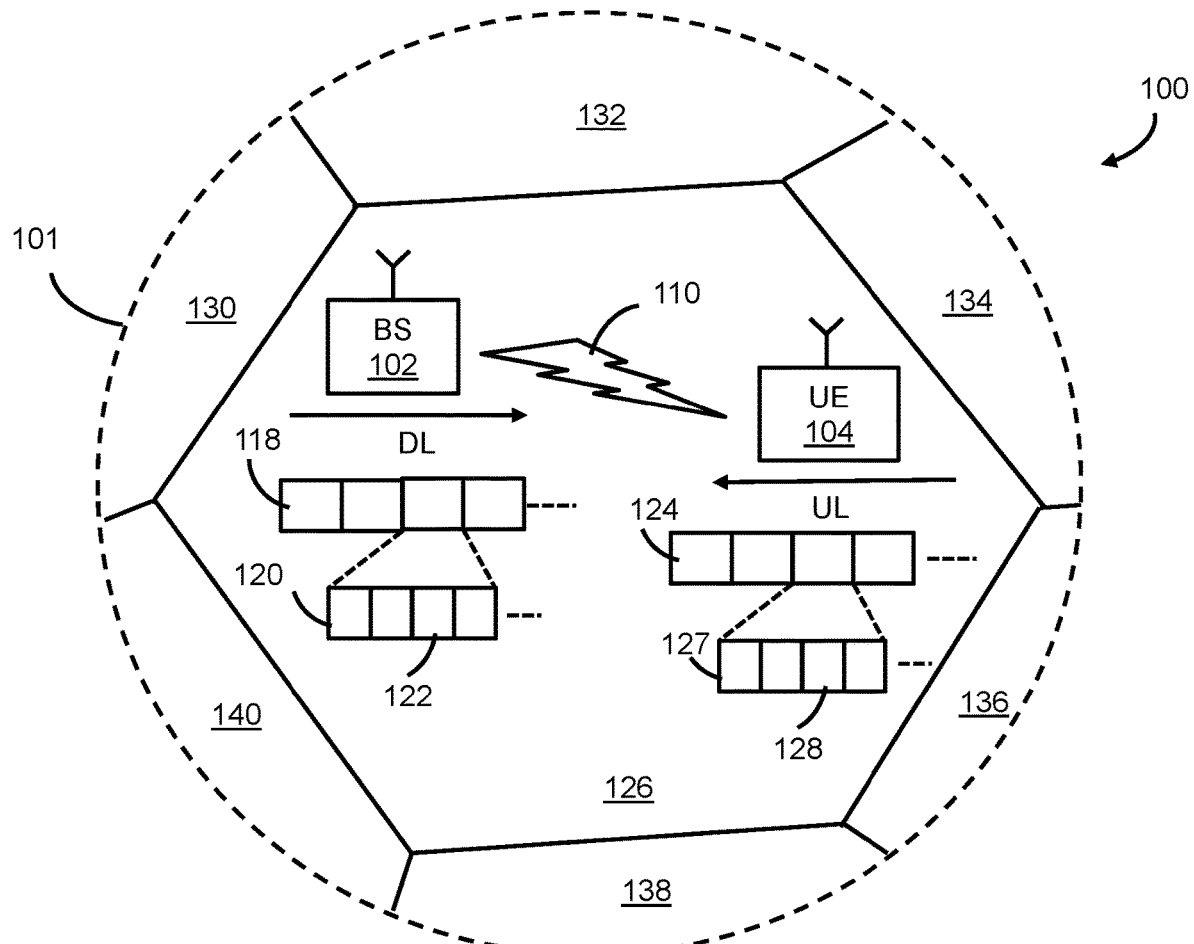
FIG. 1 illustrates an example cellular communication network in which techniques and other aspects disclosed herein may be implemented, in accordance with an implementation of the present disclosure.

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A new generation of mobile communication systems can be systematically networked on carrier frequencies higher than those used in 2G, 3G, and 4G systems. In some implementations, these systems include frequency bands of 3 GHz to 6 GHz, 6 GHz to 100 GHz. In some implementations, these bands are relatively high, the loss is greater in propagation, and similarly the coverage radius is relatively small under the same power. To align new generation system with a broader range of communication systems, including but not limited to 2G, 3G, and 4G, it is advantageous to achieve enhanced coverage in new generation of mobile communication systems. It is further advantageous to enhance the initial access channel.

It is advantageous to enhance the coverage of downlink/uplink channels and signals during initial access procedure. In some implementations, increasing SSB number for NR coverage enhancement of such channels and signals is performed during an initial access procedure. In some implementations, multiple SSBs in a time domain are defined within one transmission period. In some implementations, a maximum number of SSBs within one period is $L_{max}=4$ or 8 for FR1. In some implementations, a maximum number of SSBs within one period is $L_{max}=64$ for FR2 in accordance with various protocols. In some implementations, each SSB occupies 4 OFDM symbols in a time domain and 240 subcarriers in a frequency domain. In some implementations, one SSB includes at least one of a Primary Synchronization Signal (PSS), Secondary Synchronization Signal (SSS) and a physics broadcast channel (PBCH). In some implementations, the SSB index is indicated by PBCH DMRS for FR1. In some implementations, the SSB index is indicated by PBCH DMRS and PBCH payload for FR2.

In some implementations, a frequency location of at least one SSB does not align with an RB grid of a carrier. Thus, in some implementations, some subcarrier level offset exists between SSB and RB grid of the carrier, and can be indicated in PBCH. In some implementations, an "offset indication" ($k_{SSB}$) includes 5 bits, with a 4 bit ssb-SubcarrierOffset field and a one bit PBCH payload, for FR1. Further, in some implementations, for FR1, a valid value range for a subcarrier offset is from 0 to 23. In some implementations, for FR2, the indication includes 4 bits, with a 4 bit ssb-SubcarrierOffset field. Further, in some implementations, a valid value range for subcarrier offset is from 0 to 11. It is to be understood that the number of bits and the valid value range can be higher or lower in some implementations.

In some implementations, after receiving an SSB successfully, a UE then receives an SIB1 for further obtaining initial access configuration information carried in an SIB1 PDSCH. In some implementations, SIB1 PDCCH monitoring occasion configuration information is indicated in PBCH. In some implementations, configuration information is indicated for at least one of a control resource set (CORESET) and a search space set (SS) respectively by fields controlResourceSetZero and searchSpaceZero. In some implementations, the SIB1 PDCCH is a Type0 PDCCH. Thus, in some implementations, the search space set for Type0 PDCCH is search space zero (SS0), and the associated CORESET is CORESET0. In some implementations, the field of controlResourceSetZero is 4 bits, and up to 16 different CORESET configurations within a CORESET configuration set can be indicated by controlResourceSetZero. In some implementations, there are also 4 bits for searchSpaceZero, and at most 16 different search space set configurations within a search space set configuration set can be indicated accordingly. In some implementations, at least part of the CORESET/search space set configurations within each configuration set are predefined in a specification of at least one protocol.

In some implementations, the size of DCI format 1_0 with CRC scrambling with SI-RNTI/P-RNTI/RA-RNTI/MsgB-RNTI/TC-RNTI can be compressed by omitting some information fields or reducing bit number in some of information fields. In some implementations, for Type0-PDCCH or Type0A-PDCCH, 15 bits of total bits in the DCI are reserved bits. In some implementations, Type0-PDCCH or Type0A-PDCCH are carrying a DCI format 1_0 with CRC scrambling with SI-RNTI. In some implementations, the actual number of bits is related to a number of RBs with the bandwidth for frequency domain resource allocation. As one example, a total number of bits associated with the Type0-PDCCH or Type0A-PDCCH can be 40 bits. Then, a UE can detect type0/0A-PDCCH by assuming the size of DCI format 1_0 with CRC scrambling with SI-RNTI is 40−15=25 bits. Similarly, for Type2-PDCCH (i.e., carrying DCI format 1_0 with CRC scrambling with P-RNTI), 6 bits are reserved. Thus, in some implementations, a UE can detect type2-PDCCH, by assuming the size of DCI format 1_0 with CRC scrambling with P-RNTI is 40−6=34 bits. As one example, 40 bits is the original size of DCI format 1_0. In some implementations, for Type1-PDCCH (i.e., carrying DCI format 1_0 with CRC scrambling with RA-RNTI or MsgB-RNTI), 14 bits are reserved. Thus, in some implementations, a UE can detect type1-PDCCH by assuming the size of DCI format 1_0 with CRC scrambling with RA-RNTI or MsgB-RNTI is 40−14=26 bits. As one example, 40 bits is the original size of the DCI format 1_0 for example. Thus, in some implementations, the same DCI format (i.e., DCI format 1_0) with CRC scrambling with different RNTI will have different DCI sizes in one cell.

In some implementations, a UE can do the above assumption when it is in RRC_IDLE state or RRC_INACTIVE state. Further, in some implementations, if the UE enters in RRC_CONNECTED state, it assumes the same DCI format (i.e., DCI format 1_0) with CRC scrambling with different RNTI have a unified size.

In some implementations, SSBs are not associated with SIB1. Thus, in some implementations, there is no CORESET for a Type0 PDCCH CSS set corresponding to the SSB, and they cannot be used by UE to initialize access to a cell. In some implementations, SSBs not associated with SIB1 indicate frequency location of the next accessible SSB. Thus, in some implementations, an accessible SSB is associated with SIB1. Further, in some implementations, the 'offset indication' indicates a value outside of the range of {0~23} for FR1 and {0~11} for FR2.

As shown by way of example in Table 1, an offset indication is defined for FR1. In some implementations, a combination of '$k_{SSB}$' and '16×controlResourceSetZero+searchSpaceZero' maps to an offset value. In some implementations, an offset value corresponds to $N_{GSCN}^{Offset}$. Thus, in some implementations, the offset value determines a GSCN offset between current SSB and the next accessible SSB. In some implementations, GSCN represents an index of a synchronization raster. In some implementations, the synchronization raster is defined as a center frequency for SSB transmission. As one example, For $k_{SSB}=30$, the synchronization raster can be defined as a reserved value. Thus, in this example, no frequency location of accessible SSB is indicated.

TABLE 1

| $k_{SSB}$ | 16 × controlResourceSetZero + searchSpaceZero | $N_{GSCN}^{Offset}$ |
|---|---|---|
| 24 | 0, 1, . . . , 255 | 1, 2, . . . , 256 |
| 25 | 0, 1, . . . , 255 | 257, 258, . . . , 512 |
| 26 | 0, 1, . . . , 255 | 513, 514, . . . , 768 |
| 27 | 0, 1, . . . , 255 | −1, −2, . . . , −256 |
| 28 | 0, 1, . . . , 255 | −257, −258, . . . , −512 |
| 29 | 0, 1, . . . , 255 | −513, −514, . . . , −768 |
| 30 | 0, 1, . . . , 255 | Reserved, Reserved, . . . , Reserved |

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
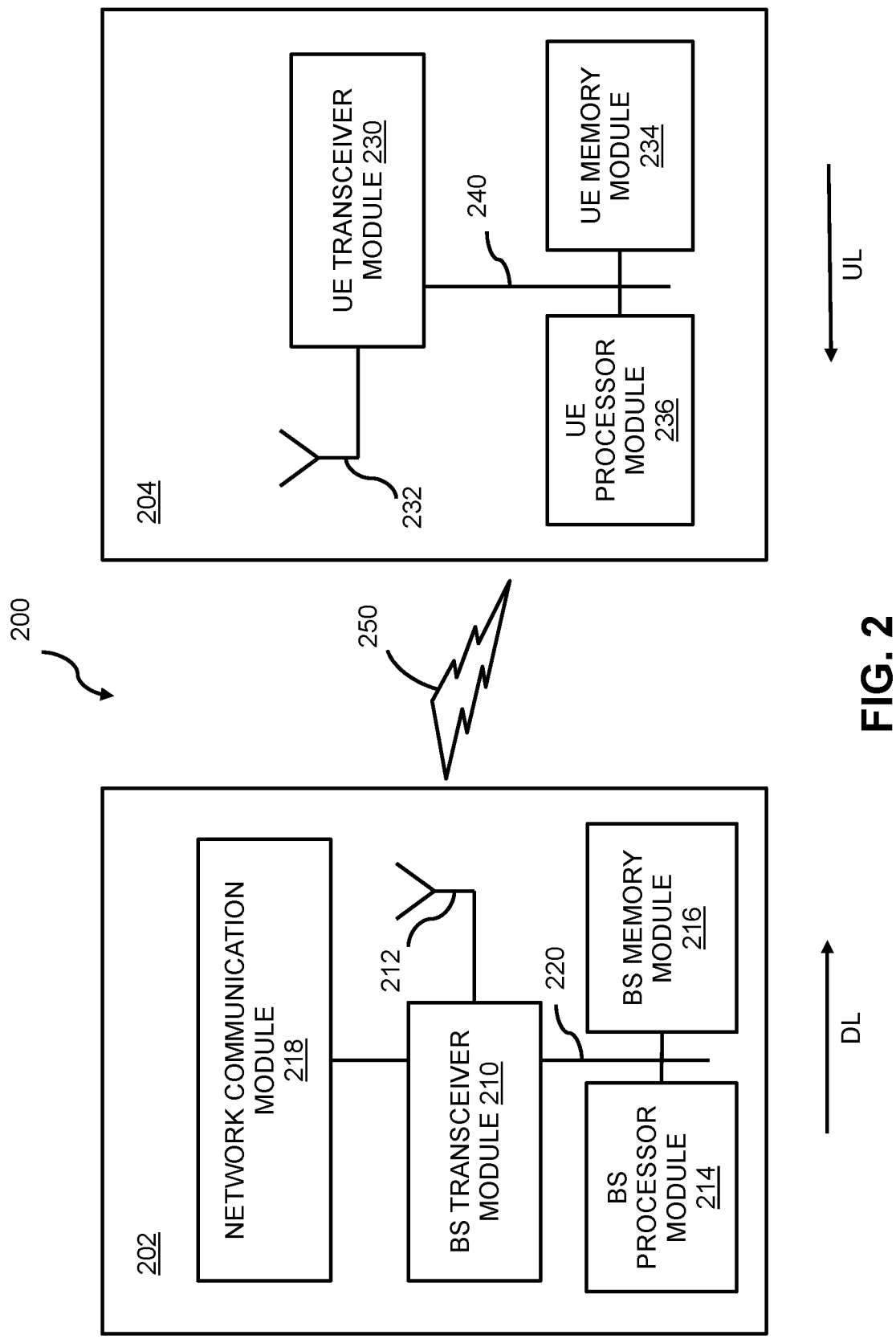
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 can be various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be implemented directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3:
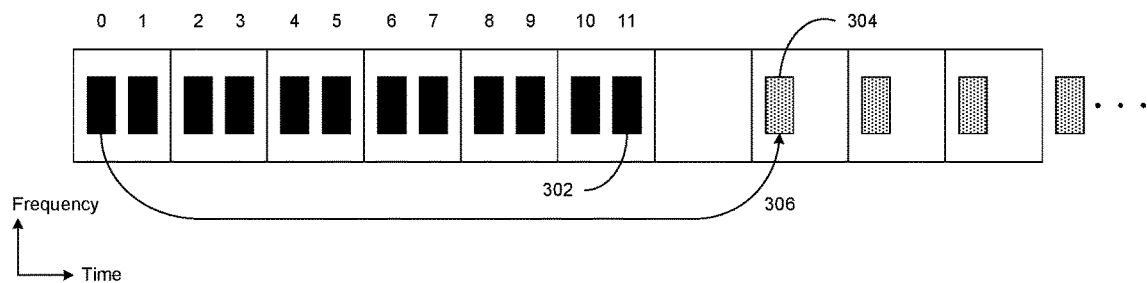
FIG. 3 illustrates an example schematic of associating SSB for a first type of UE, in accordance with some implementations of the present disclosure.

FIG. 3 illustrates an example schematic of associating SSB for a first type of UE and a second type of UE, in accordance with some implementations of the present disclosure. As illustrated by way of example in FIG. 3, example system 300 includes SSBs 302, SIB1 PDCCH MO blocks 304, and block association 306. In FIG. 3, the x-axis corresponds to time, and the y-axis corresponds to frequency or Bandwidth Part (BWP).

In some implementations, an example system increases SSB number in accordance with FIG. 3. As an example, the SSB number can been extended to '12' from SSB0 to SSB11. In this example, for each SSB, the value of $k_{SSB}$ indicates a reserved value. Thus, in this example, for FR1, the reserved $k_{SSB}$ value is 30, and for FR2, the reserved $k_{SSB}$ value is 14. In some implementations, legacy UEs ignore this SSB and further detect other SSB on another synchronization raster (sync raster).

In some implementations, new UEs correspond to coverage enhancement UEs (CE UEs), which support to access to the cell via new SSBs with larger numbers compared with legacy SSBs. In some implementations, for new UEs, a value of $k_{SSB}$ identified as a reserved value indicates an accessible SSB. Thus, the example system, in some implementations, determines the subcarrier offset of the SSB and SIB1 PDCCH monitoring occasion 304 configuration from an indication fields of controlResourceSetZero and searchSpaceZero in the PBCH.

Thus, in some implementations, a new mapping relationship is predefined by specification or configured though RRC signaling. In some implementations, the mapping relationship represents mapping between an offset configuration and a combination of values. In some implementations, the offset configuration is or includes the configuration of the subcarrier offset of the SSB and configuration for SIB1 PDCCH monitoring occasion. In some implementations, the combination of values is or includes controlResourceSetZero and searchSpaceZero.

As one example, 8 bits in total are associated with fields controlResourceSetZero and searchSpaceZero in PBCH. In this example, 5 bits from the above 8 bits can be used to indicate subcarrier offset of the SSB. Further, in this example, the remaining 3 bits can be used for indicating SIB1 PDCCH monitoring occasion configuration. In some implementations, there are at most 8 different PDCCH monitoring occasion configurations. In one implementations, one PDCCH monitoring occasion configuration is used according to the 3 bit indication. In some implementations, other bits in PBCH indicate PDCCH monitoring occasion configuration, together with the above 3 bits. As one example, another 3 bits can be used. Thus, in this example, 6 bits are associated with PDCCH monitoring occasion configuration. In some implementations, at most 64 different PDCCH monitoring occasion configurations can be defined. Alternatively, in some implementations, CORESET and search space set can be indicated, respectively. For example, 6 bits in total indicate a PDCCH monitoring occasion configuration. In this example, 3 bits are used for indicating CORESET, and another 3 bits are used for indicating a search space set. Thus, advantages of the above implementation can increase SSB number for new UEs to access the cell. Thus, in some implementations, higher beamforming gain and better coverage performance for all signals and channels during initial access procedure can be achieved with no impact on legacy UEs.

Figure 4:
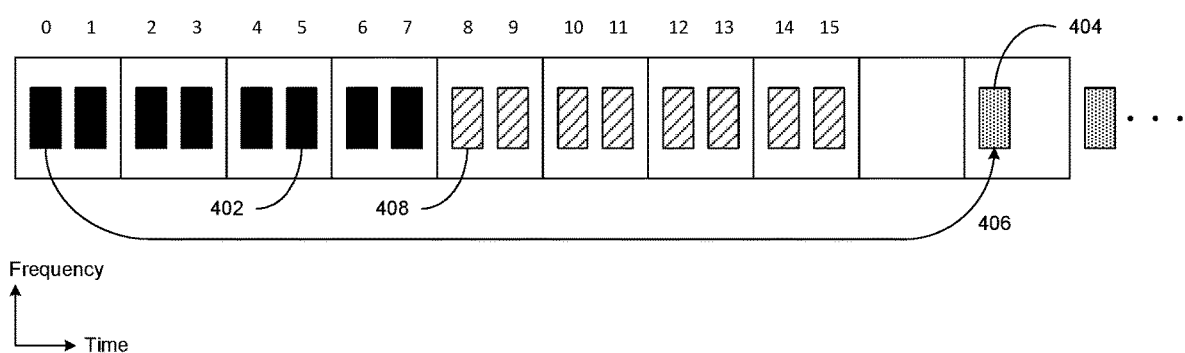
FIG. 4 illustrates an example schematic of associating SSB for a first type of UE and a second type of UE, in accordance with some implementations of the present disclosure.

FIG. 4 illustrates an example schematic of associating SSB for a first type of UE and a second type of UE, in accordance with some implementations of the present disclosure. As illustrated by way of example in FIG. 4, example system 400 includes first type SSBs 402, SIB1 PDCCH MO blocks 304, block association 306, and second type SSBs 408. In FIG. 4, the x-axis corresponds to time, and the y-axis corresponds to frequency or BWP.

In some implementations, an example system increases SSB number in accordance with FIG. 4. As an example, the SSB number can be extended to '16' from SSB0 to SSB15. Thus, in this example, SSB 0~7 are legacy SSBs, and can be used for accessing the cell by both legacy UEs and new UEs. In some implementations, SSB 8~15 are new SSBs. In some implementations, only new UEs can use the new SSBs, and the new SSBs can be used for accessing the cell by only new UEs. In some implementations, for new UEs, both legacy SSB 0~7 and new SSB 8~15 can be used for accessing the cell.

In some implementations, in PBCH of SSB 0~7, the subcarrier offset $k_{SSB}$ of the SSB is indicated by a 4 bit ssb-SubcarrierOffset field and another 1 bit PBCH payload field for FR1. In some implementations, an SIB1 PDCCH monitoring occasion configuration is indicated by fields controlResourceSetZero and searchSpaceZero. In some implementations, for avoiding impact on legacy UEs, the value of $k_{SSB}$ in PBCH of SSB 8~15 indicates a reserved value. As one example, for FR1, the reserved $k_{SSB}$ value is 30, and for FR2, the reserved $k_{SSB}$ value is 14. Thus, in some implementations, a legacy UE ignores the above SSBs. In some implementations, the subcarrier offset of SSB 8~15 is same as that of SSB 0~7. Thus, in some implementations, if a new UE detects an SSB and finds that the $k_{SSB}$ indicates a reserved value, the new UE determines the subcarrier offset from another SSB within SSB0~7 located in the same frequency.

For SIB1 PDCCH monitoring occasion configuration of SSB 8~15 can be determined in multiple ways, according to present implementations.

In one implementation, there is no SIB1 associated with SSB 8~15. In one implementation, no indication is needed for SIB1 PDCCH monitoring occasion configuration of SSB 8~15. Thus, in one implementation, the fields of 'controlResourceSetZero' and 'searchSpaceZero' in PBCH of SSB 8~15 are reserved. Alternatively, in one implementation, those fields are used for other information indication. In one implementation, the SIB1 PDCCH monitoring occasion configuration of SSB 8~15 is indicated by the fields 'controlResourceSetZero' and 'searchSpaceZero' in PBCH of SSB 8~15. Thus, in one implementation, the configuration of SSB 8~15 can be the same or different than that of SSB 0~7. In one implementation, the SIB1 PDCCH monitoring occasion configuration of SSB 8~15 is the same as that of SSB 0~7. In one implementation, if a new UE detects a SSB and find the $k_{SSB}$ indicates a reserved value, then the new UE will determine the SIB1 PDCCH monitoring occasion configuration of a first SSB from a second SSB located in the same frequency. As one example the first SSB is one of SSB8~15, and the second SSB is within SSB0~7. Thus, in one implementation, fields of 'controlResourceSetZero' and 'searchSpaceZero' in PBCH of SSB 8~15 are reserved. Alternatively, in one implementation, the fields are used for other information indications.

In some implementations, for PRACH transmission, a transmission time domain resource is defined as a RACH occasion (RO). In some implementations, the RO is associated with each SSB. In some implementations, the association between SSB and RO is configured in SIB1. In some implementations, the new UEs always access the cell based on SSB 0~7. Thus, in some implementations, even if the new UE detects a SSB with index 8~15, the new UE accesses the cell based on SSB 0~7. In some implementations, the new UE reports the detected SSB with index 8~15 in a later phase, e.g., via Msg.1 or Msg.3. Further, in some implementations, the new UE or the example system transmits PRACH in RO corresponding with one of SSB 0~7.

In some implementations, for an RO associated with SSB 8~15, a different association rule is configured via SIB1 and associated with SSB 8~15, as compared to an association rule between RO and SSB 0~7. Thus, in some implementations, if a new UE detects a SSB with index 8~15, the new UE transmits PRACH in RO corresponding with the SSB detected. In one implementation, for an association rule between RO and a new SSB, a time domain offset (Toffset) on top of RO is associated with the legacy SSB. For example, the first legacy SSB, i.e., SSB0 is associated with RO0, the second legacy SSB, i.e., SSB1 is associated with RO1, and so on. In one implementation, for SSB 8~15, the first new SSB, i.e., SSB8 is associated with a RO start from starting point of RO0+Toffset, the second new SSB, i.e., SSB9 is associated with a RO start from starting point of RO1+Toffset, and so on. Further, in one implementation, the time domain duration of RO is the same as for RO associated with SSB 0~7.

Alternatively, in one implementation, for the association rule between RO and a new SSB, a frequency domain offset (Foffset) on top of a frequency resource within an RO is associated with a legacy SSB. For example, the first legacy SSB, i.e., SSB0 is associated with RO0 and frequency f0, the second legacy SSB, i.e., SSB1 is associated with RO1 and frequency f0, and so on. Thus, in one implementation, for SSB 8~15, the first new SSB, i.e., SSB8 is associated with RO0 and frequency f0+Foffset, the second new SSB, i.e., SSB9 is associated with RO1 and frequency f0+Foffset, and so on. Further, in one implementation, the time domain duration of RO is same as RO associated with SSB 0~7.

In some implementations, the SSB index indication method of new SSBs can be the same as legacy SSBs. In some implementations, the first new SSB (e.g., SSB8) is indicated as SSB0 and as a virtual SSB index. Thus, as one example, if a new UE detects a new SSB (i.e., $k_{SSB}$ is reserved value), the new UE determines the SSB index as virtual SSB index+maximum number of legacy SSBs=0+8=8. Thus, advantages of the above implementation can increase SSB number for new UEs to access the cell. Thus, in some implementations, higher beamforming gain and better coverage performance for all signals and channels during initial access procedure can be achieved with no impact on legacy UEs.

Figure 5:
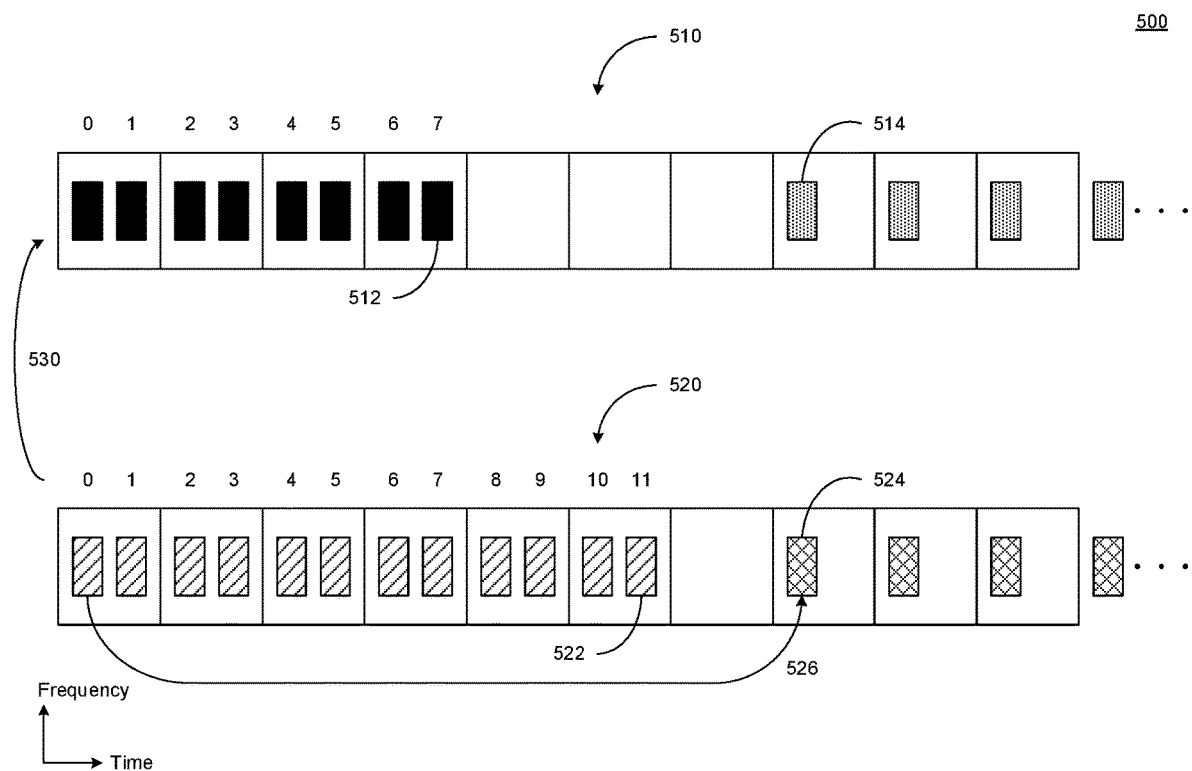
FIG. 5 illustrates an example schematic of associating SSB for a first type of UE and a second type of UE with a first sync raster, and associating SSB for a second type of UE with a second sync raster, in accordance with some implementations of the present disclosure.

FIG. 5 illustrates an example schematic of associating SSB for a first type of UE and a second type of UE with a first sync raster, and associating SSB for a second type of UE with a second sync raster, in accordance with some implementations of the present disclosure. As illustrated by way of example in FIG. 5, example system 500 includes a first frequency range 510, a second frequency range 520, and a block association 530. In some implementations, the frequency range represents system bandwidth or bandwidth part (BWP). The first frequency range 510 includes first type SSBs 512 on sync raster 1, and first type SIB1 PDCCH MO blocks 514. The second frequency range 520 includes second type SSBs 522 on sync raster 2, second type SIB1 PDCCH MO blocks 524, and block association 526. In FIG. 5, the x-axis corresponds to time, and the y-axis corresponds to frequency or BWP.

In some implementations, an example system increases SSB number in accordance with FIG. 5. In some implementations, SSB 0~7 on sync raster 1 is used for accessing the cell by both legacy UE and new UE. In some implementations, SSB 0~11 on sync raster 2 is used for accessing the cell by only new UE. In some implementations, for SSB 0~11 on sync raster 2, fields of $k_{SSB}$, controlResourceSetZero and searchSpaceZero in PBCH are used to indicate frequency location of accessible SSBs. In some implementations, accessible SSBs are associated with a first sync raster. In some implementations, $k_{SSB}$ indicates {24~29} for FR1, and {12,13} for FR2. Based at least partially on the values of $k_{SSB}$ and fields of controlResourceSetZero and searchSpaceZero in the PBCH of SSB 0~11 on sync raster 2, the frequency location of the next accessible SSB, i.e., the first sync raster is indicated. As one example, according to the above configuration, if a legacy UE detects a SSB with value of $k_{SSB}$ equals to one of {24~29} for FR1 (or {12,13} for FR2), it skips to sync raster 1 for further cell searching.

As another example, if a new UE detects an SSB with value of $k_{SSB}$ equals to one of {24~29} for FR1, or, optionally, {12,13} for FR2, it determines an SSB as an accessible SSB for new UEs. In this example, the new UE skips to sync raster 1, and detects an SSB on the sync raster 1. In some implementations, configuration information obtained from SSB on the sync raster 1 is also used for accessing the cell though SSB on sync raster 2. In some implementations, the configuration information includes at least one of subcarrier offset of SSB and SIB1 PDCCH monitoring occasion. Thus, advantages of the above implementation can increase SSB number for new UEs to access the cell. Thus, in some implementations, higher beamforming gain and better coverage performance for all signals and channels during initial access procedure can be achieved with no impact on legacy UEs.

Figure 6:
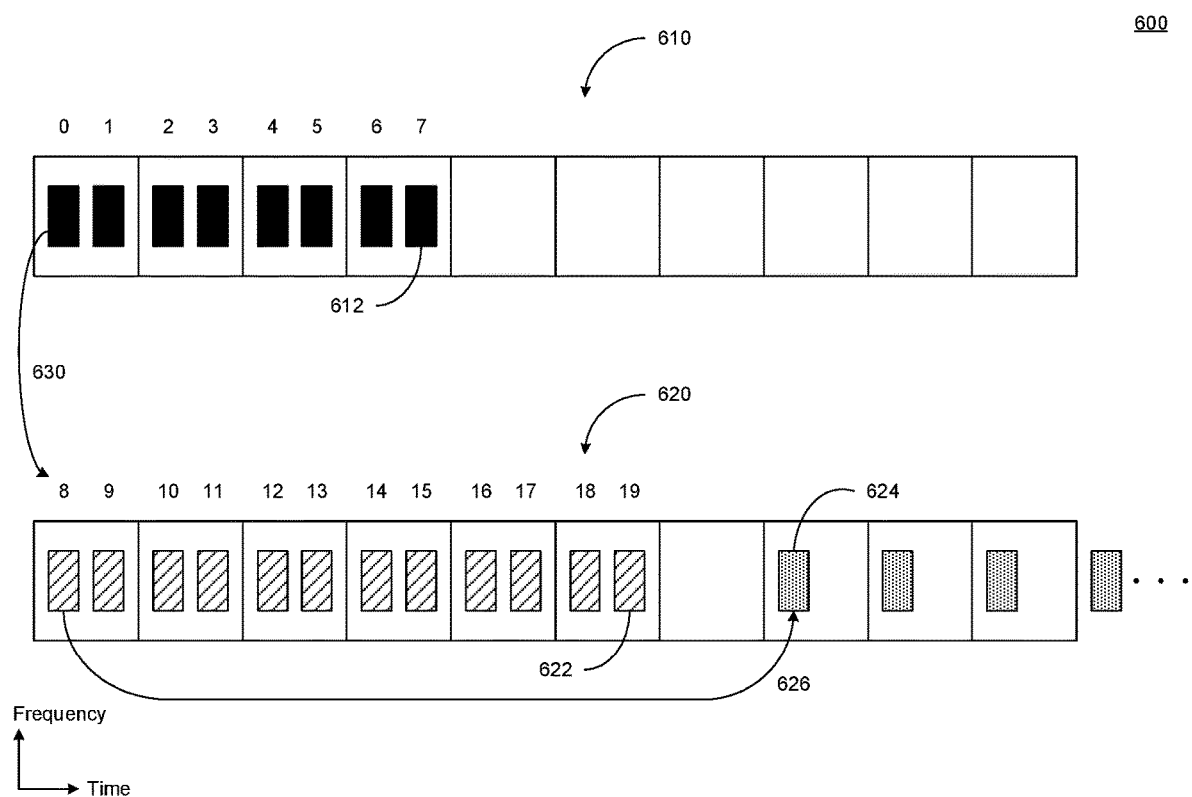
FIG. 6 illustrates an example schematic of associating SSB for a first type of UE not associated with SIB1 with a first sync raster, and associating SSB for a second type of UE with a second sync raster, in accordance with some implementations of the present disclosure.

FIG. 6 illustrates an example schematic of associating SSB for a first type of UE not associated with SIB1 with a first sync raster, and associating SSB for a second type of UE with a second sync raster, in accordance with some implementations of the present disclosure. As illustrated by way of example in FIG. 6, example system 600 includes a first frequency range 610, a second frequency range 620, and a block association 630. The first frequency range 610 includes first type SSBs 612 on sync raster 1. The second frequency range 620 includes second type SSBs 622 on frequency 2, SIB1 PDCCH MO blocks 624, and block association 626. In FIG. 6, the x-axis corresponds to time, and the y-axis corresponds to frequency or BWP.

In some implementations, an example system increases SSB number in accordance with FIG. 6. In some implementations, SSB 0~7 on sync raster 1 are legacy SSBs, but are not associated with SIB1. Thus, in some implementations, SSB 0~7 cannot be used for accessing the cell by either legacy UE or by new UE. In some implementations, for each SSB on sync raster 1, the value of $k_{SSB}$ will indicate a reserved value. In some implementations, for FR1, the reserved $k_{SSB}$ value is 30, and for FR2, the reserved $k_{SSB}$ value is 14. In some implementations, legacy UEs ignore this SSB and further detect other SSB on another sync raster.

In some implementations, the value of controlResourceSetZero and searchSpaceZero in the PBCH of SSB in sync raster 1 are used to indicate frequency location (i.e., frequency 2) of an accessible SSB for new UEs. In some implementations, 8 bits in total are associated with controlResourceSetZero and searchSpaceZero, and at most 256 offset from frequency location of current SSB can be indicated. In some implementations, granularity can be N times of interval between two neighboring channel rasters, or other predefined granularity value. For example, if value of controlResourceSetZero and searchSpaceZero equals 2 and the interval between two neighbouring channel rasters is M, the frequency offset is 2*N*M. As another example, if the center frequency of current SSB is f0, the center frequency of the accessible SSB is f0+2*M*N. In some implementations, the center frequency is associated with the frequency 2. In some implementations, for new UEs, if the value of $k_{SSB}$ is identified as a reserved value, the new UEs follow the above rule to determine frequency 2, and detect SSB on frequency 2.

In some implementations, the frequency relationship between sync raster 1 and frequency 2 is predefined. For example, the offset is preconfigured by RRC signaling. Thus, in this example, there is no need to indicate $k_{SSB}$ to a reserved value. Thus, an SSB on sync raster 1 can also be used for accessing the cell by legacy UEs. In some implementations, for new UEs, they can determine frequency 2 according to the predefined frequency relationship, and detect SSB on frequency 2. Thus, advantages of the above implementation can increase SSB number for new UEs to access the cell. Thus, in some implementations, higher beamforming gain and better coverage performance for all signals and channels during initial access procedure can be achieved with no impact on legacy UEs.

Figure 7:
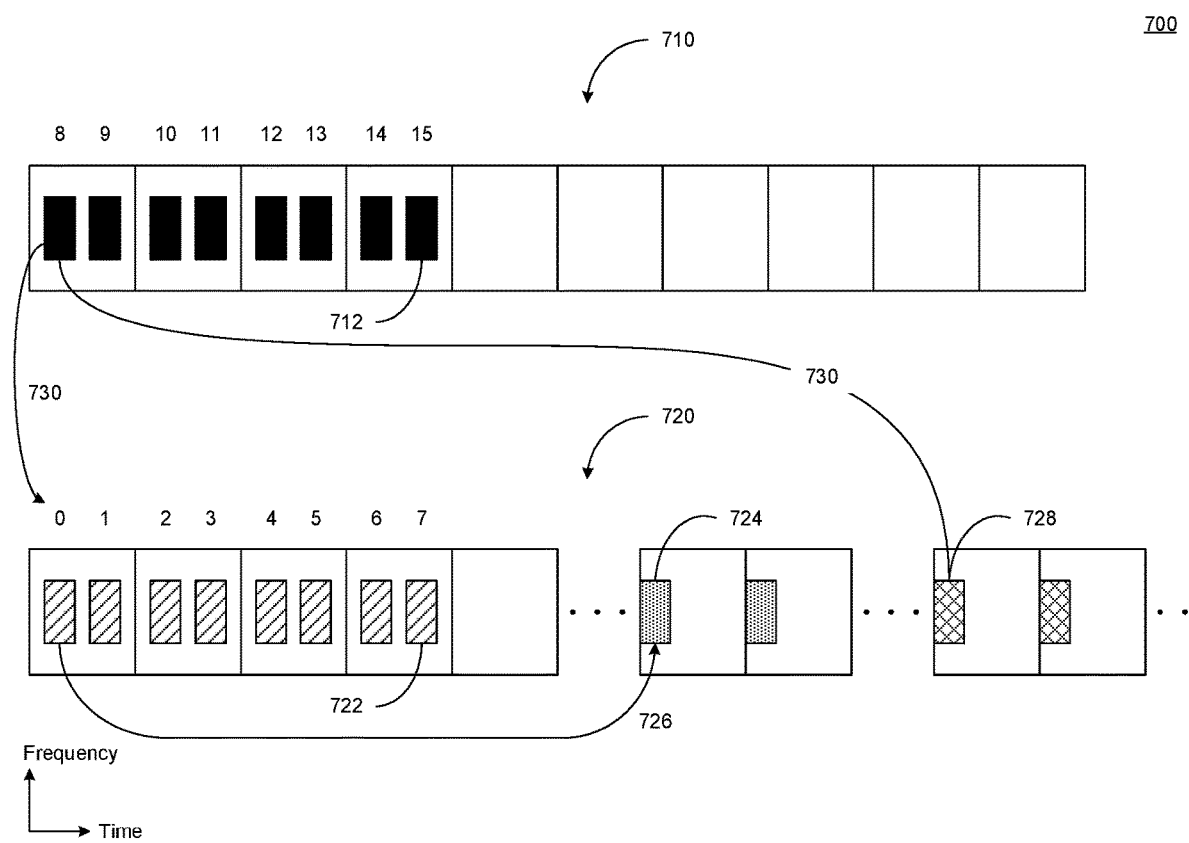
FIG. 7 illustrates an example schematic of associating SSB for a first type of UE not associated with SIB1 with a first sync raster, and associating SSB for the first type of UE and a second type of UE with a second sync raster, in accordance with some implementations of the present disclosure.

FIG. 7 illustrates an example schematic of associating SSB for a first type of UE not associated with SIB1 with a first sync raster, and associating SSB for the first type of UE and a second type of UE with a second sync raster, in accordance with some implementations of the present disclosure. As illustrated by way of example in FIG. 7, example system 700 includes a first frequency range 710, a second frequency range 720, and a block association 730. The first frequency range 710 includes first type SSBs 712 on sync raster 1. The second frequency range 720 includes second type SSBs 722 on sync raster 2, first type SIB1 PDCCH MO blocks 724, second type SIB1 PDCCH MO blocks 728, and block association 726. In FIG. 7, the x-axis corresponds to time, and the y-axis corresponds to frequency or BWP.

In some implementations, an example system increases SSB number in accordance with FIG. 7. In some implementations, SSB 0~7 on sync raster 2 is used for accessing the cell by both legacy UE and new UE. In some implementations, SSB 8~15 on sync raster 1 is used for accessing the cell by only new UE. In some implementations, for SSB 8~15 on sync raster 1, fields of $k_{SSB}$, controlResourceSetZero and searchSpaceZero in PBCH indicate frequency location of an accessible SSB. In some implementations, an accessible SSB is associated with sync raster 2. In some implementations, $k_{SSB}$ indicates {24~29} for FR1, and {12, 13} for FR2. Based at least partially on values of $k_{SSB}$ and fields of controlResourceSetZero and searchSpaceZero, sync raster 2 is, in some implementations, indicated as the frequency location of the next accessible SSB. As one example, according to the above configuration, if a legacy UE detects an SSB on sync raster 1 with a value of $k_{SSB}$ equal to one of {24~29} for FR1, or {12,13} for FR2, the legacy UE skips to sync raster 2 for further cell searching basing on SSB 0~7. As another example, if a new UE detects an SSB on sync raster 1 with a value of $k_{SSB}$ equal to one of {24~29} for FR, or {12,13} for FR2, both SSBs on sync raster 1 and sync raster 2 are accessible for new UEs. In some implementations, all SSBs on either sync raster 1 or sync raster 2 are associated with a same cell, and can be used for accessing the cell. In some implementations, configuration information, including SIB1 PDCCH monitoring occasion, is only carried in PBCH of SSB on sync raster 2.

In some implementations, the UE skips to sync raster 2, and detects an SSB on sync raster 2. The configuration information obtained from the SSB on sync raster 2 is used for accessing the cell. In some implementations, one or more SSB 8~15 on sync raster 1 can share the same SIB1 PDCCH monitoring occasion configuration. In some implementations, the time/frequency domain location of SIB1 PDCCH MOs corresponding to all SSBs from 0 to 15 is determined according to the configuration information.

In some implementations, a UE selects an SSB from SSB 0~15. For example, an SSB with highest RSRP can be selected or an SSB with RSRP higher than a predefined threshold. In some implementations, the SSB index is used for determining at least one SIB1 PDCCH MO corresponding to the selected SSB. In some implementations, the SSB index indication method of SSB 8~15 can be the same as SSB 0~7, that is, by PBCH DMRS sequence or by PBCH DMRS sequence and PBCH payload. In some implementations, the SSB8 is indicated as SSB0 as a 'virtual' SSB index. As one example, if a new UE detects a new SSB, the new UE determines the actual SSB index as virtual SSB index+maximum number of legacy SSBs=0+8=8. In some implementations, a new UE detects a new SSB on sync raster 1 that further points to another sync raster (e.g., sync raster 2). Thus, advantages of the above implementation can increase SSB number for new UEs to access the cell. Thus, in some implementations, higher beamforming gain and better coverage performance for all signals and channels during initial access procedure can be achieved with no impact on legacy UEs.

Figure 8:
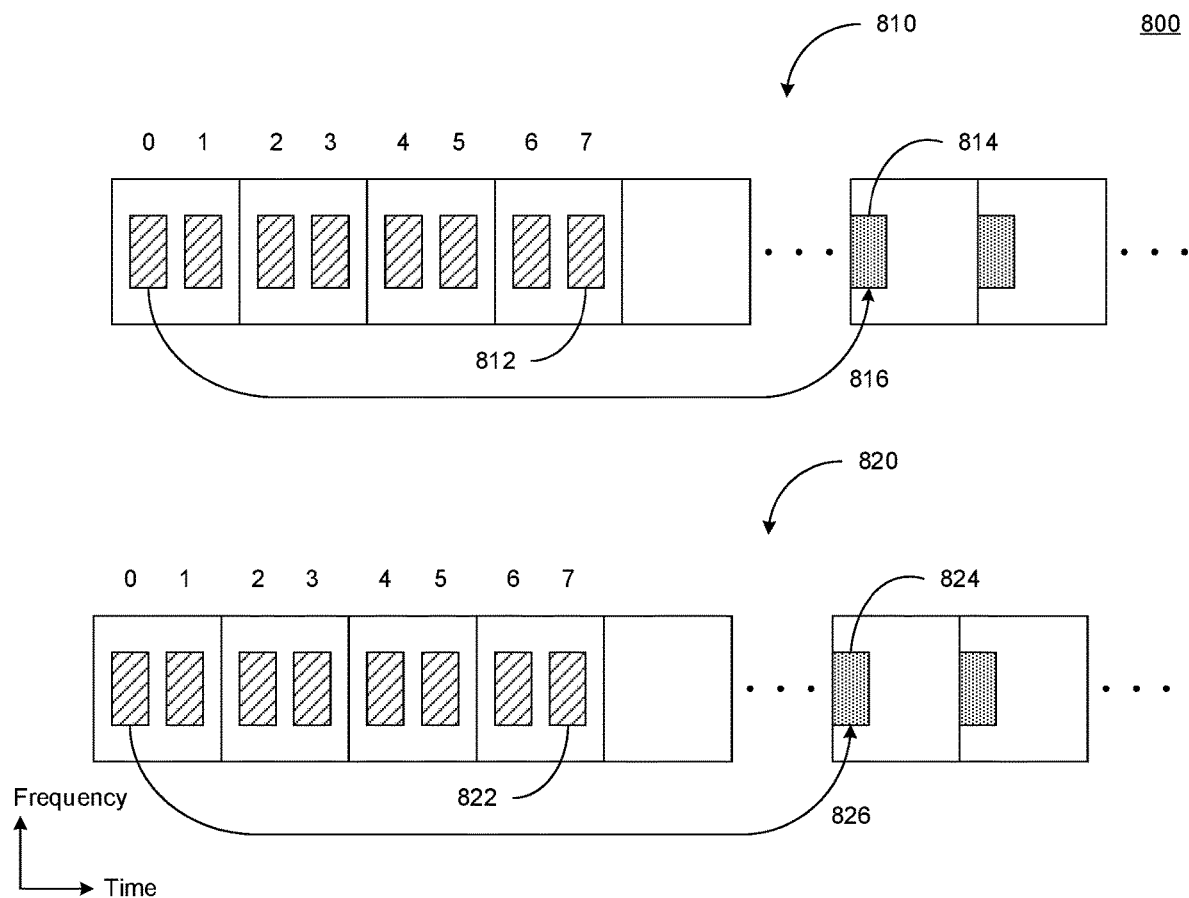
FIG. 8 illustrates an example schematic of associating SSB for a first type of UE with at least one of a first sync raster and a second sync raster, and associating SSB for a second type of UE with at least one of the first sync raster and the second sync raster, in accordance with some implementations of the present disclosure.

FIG. 8 illustrates an example schematic of associating SSB for a first type of UE with at least one of a first sync raster and a second sync raster, and associating SSB for a second type of UE with at least one of the first sync raster and the second sync raster, in accordance with some implementations of the present disclosure. As illustrated by way of example in FIG. 8, example system 800 includes a first frequency range 810, and a second frequency range 820. The first frequency range 810 includes a first group of SSBs 812 on sync raster 1, a first group of SIB1 PDCCH MO blocks 814, and a first block association 816. The second frequency range 820 includes a second group of SSBs 822 on sync raster 2, a second group of SIB1 PDCCH MO blocks 824, and a second block association 826. In FIG. 8, the x-axis corresponds to time, and the y-axis corresponds to frequency or BWP.

In some implementations, an example system increases SSB number in accordance with FIG. 8. In some implementations, there are more than one frequency in one carrier for SSB transmission. As an example shown in FIG. 8, two groups of SSBs are located at sync raster 1 and sync raster 2, respectively. In some implementations, for a legacy UE, the above two groups of SSBs will be considered as different cells, and can access either cell from an SSB on corresponding sync raster. In some implementations, configuration information of SIB1 PDCCH MO is indicated from the corresponding SSB, respectively. In some implementations, a new UE is configured such that SSBs on sync raster 1 and sync raster 2 correspond to the same cell. Thus, in some implementations, the number of SSBs for one cell is increased.

In some implementations, the SSB index indicated by PBCH DMRS sequence or by PBCH DMRS sequence and PBCH payload is considered as 'virtual' SSB index. In some implementations, the 'actual' SSB index is determined according to different sync rasters. In some implementations, the sync raster index M is configured for each sync raster from 0. For example, according to a ascending order in frequency domain. In this example, where the index of the sync raster with lowest frequency among all sync rasters carrying SSB corresponding to a same cell is 0, the index of sync raster with secondary lowest frequency among all sync rasters carrying SSB corresponding to a same cell is 1. In some implementations, the maximum number of SSBs is N, and the 'actual' SSB index equals to 'virtual' SSB index+ M*N. In some implementations, sync raster 2 is lower than sync raster 1 in a frequency domain. Thus, in some implementations, an index of sync raster 2 is 0, and the index of sync raster 1 is 1. Further, in some implementations, the actual indices of SSB0~7 on sync raster 2 are SSB0~7, and the actual index of SSB0~7 on sync raster 1 are SSB 8~15.

Figure 9:
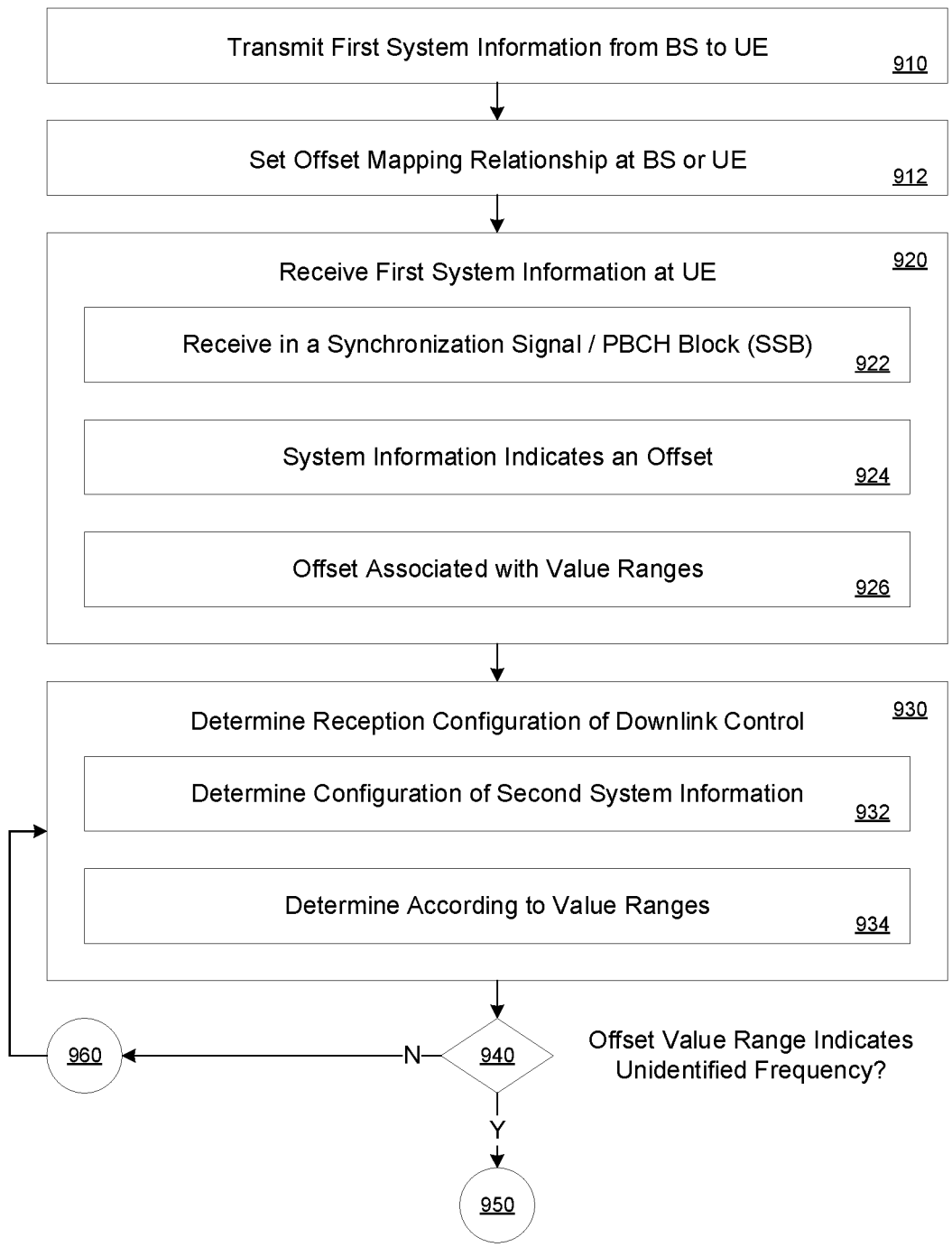
FIG. 9 illustrates an example method, in accordance with some implementations of the present disclosure.

FIG. 9 illustrates an example method in accordance with some implementations of the present disclosure. In some implementations, at least one of the BS 202 and the UE 201 performs method 900 according to present implementations. In some implementations, the method 900 begins at 910. At 910, an example system transmits first system information from BS 102 to UE 104. At 912, the example system sets at least one offset mapping relationship by at least one of BS 102 and UE 104. At 920, an example system receives a first system information in a Synchronization Signal/Physical Broadcast Channel (PBCH) Block (SSB).

In some implementations, the SSB corresponds to at least one of blocks 302, 402, 512, 612, 712, 722, 812 and 822. In some implementations, the first system information indicates an offset, and at least two value ranges are defined for the offset. In some implementations, a first value range indicates a subcarrier offset of the SSB. In some implementations, a second value range indicates a frequency location of another SSB associated with the second system information. In some implementations, second system information includes at least one System Information Block 1 (SIB1) 304, 404, 514, 524, 624, 724, 814 and 824. In some implementations, second system information supports at least one access procedure between the BS 102 and the UE 104. In some implementations, 920 includes at least one of 922, 924, and 926. The method 900 then continues to 930. At 930, the example system determines reception configuration of downlink control of second system information according to one of the at least two value ranges. In some implementations, 930 includes at least one of 932 and 934. The method 900 then continues to 940.

At 940, the example system determines whether an offset value ranges is within a third frequency range. In some implementations, a third frequency range indicates an unidentified frequency. In accordance with a determination that the offset range is within the third frequency range, the example system continues to 950. Alternatively, in accordance with a determination that the offset range is not within the third frequency range, the example system continues to 960. At 950, the method 900 continues to method 1000. At 960, the method 900 optionally continues to 920.

Figure 10:
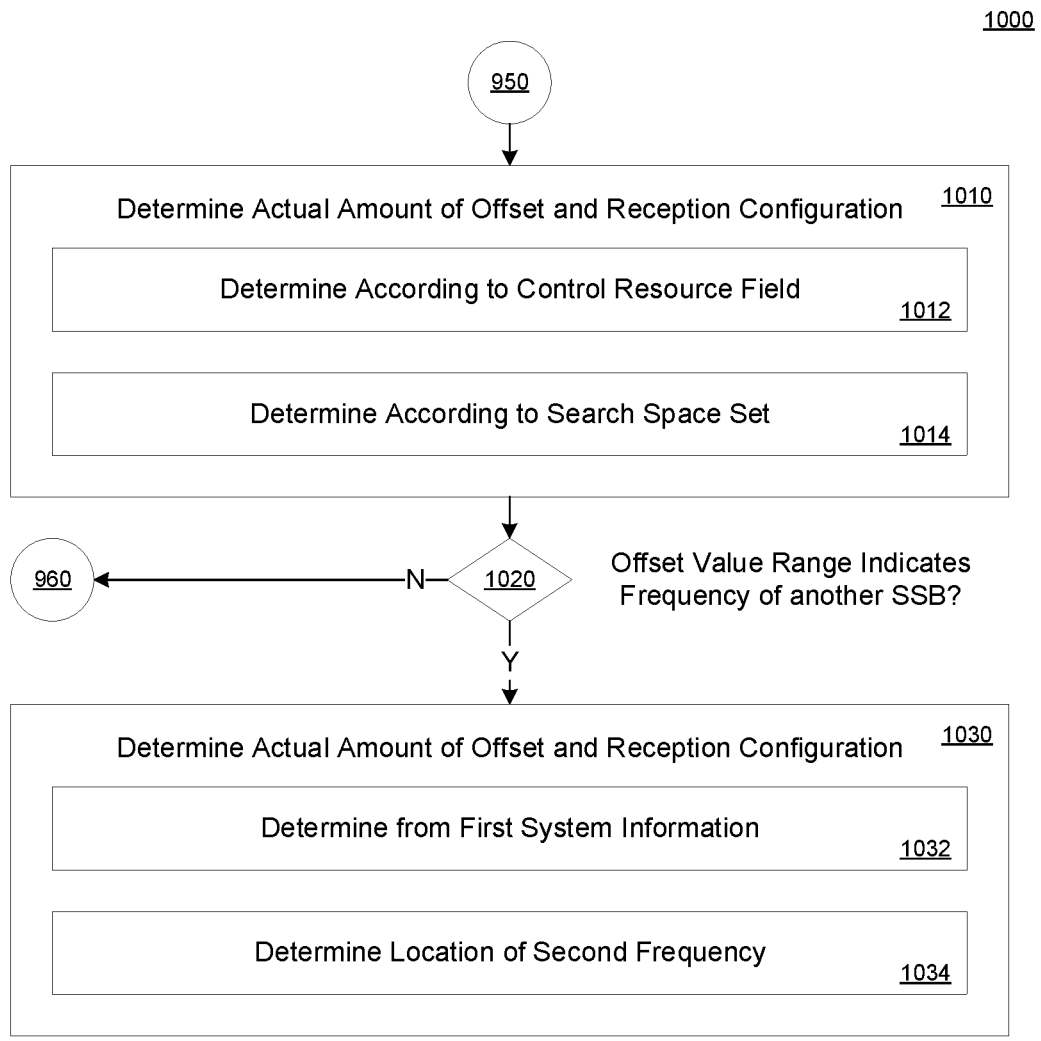
FIG. 10 illustrates an example method, in accordance with some implementations of the present disclosure.

FIG. 10 illustrates an example method in accordance with some implementations of the present disclosure. In some implementations, at least one of the BS 202 and the UE 201 performs method 1000 according to present implementations. In some implementations, the method 1000 begins at 1010. At 1010, the example system determines an actual amount of offset and a reception configuration. In some implementations, 1010 includes at least one of 1012 and 1014. At 1012, the example system determines according to a control resource field. At 1014, the example system determines according to a search space set. In some implementations, the method 1000 then continues to 1020. At 1020, the example system determines whether an offset value range is within a second range. In some implementations, a second value range indicates a frequency of another SSB. In some implementations, another SSB is at least one of 522, 622, 722 and 822. In accordance with a determination that the offset value range is within the second range, the method 1000 continues to 1030. Alternatively, in accordance with a determination that the offset value range is not within the second range, the method 1000 continues to 960.

At 1030, the example system determines an actual amount of offset and a reception configuration. In some implementations, 1030 includes at least one of 1032 and 1034. At 1032, the example system determines based at least partially on received first system information. At 1034, the example system determines location of a second frequency. In some implementations, the method 1000 ends at 1030.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a wireless communication device from a base station, first system information in a first-type Synchronization Signal/Physical Broadcast Channel (PBCH) Block (SSB), wherein the first system information indicates an offset, and at least two value ranges are defined for the offset; and
determining, by the wireless communication device, a reception configuration of downlink control of second system information according to one of the at least two value ranges,
wherein the first-type SSB and a second-type SSB are located in a same frequency,
wherein the at least two value ranges for the offset comprise a first value range indicating an undefined frequency location of another SSB associated with the second system information.

2. The wireless communication method of claim 1, wherein
the first system information is carried on a PBCH of the first-type SSB;
the offset is indicated by a $k_{SSB}$ value;
the downlink control comprises a Physical Downlink Control Channel (PDCCH); and
the second system information comprises System Information Block 1 (SIB1).

3. The wireless communication method of claim 1, wherein the at least two value ranges comprises:
a second value range indicating a subcarrier offset of the first-type SSB; and
a third value range indicating a frequency location of the another SSB associated with the second system information.

4. The wireless communication method of claim 3, wherein determining the reception configuration of the downlink control of the second system information comprises:
in response to determining that the offset is a value within the first value range, determining, by the wireless communication device, an actual amount of the subcarrier offset and the reception configuration of the downlink control of the second system information according to fields of a control resource set and a search space set in the first system information.

5. The wireless communication method of claim 4, wherein
the actual amount of the subcarrier offset is determined by a first number of bits in the fields of the control resource set and the search space set in the first system information; and
the reception configuration of the downlink control of the second system information are determined by a second number of bits in the fields of the control resource set and the search space set in the first system information.

6. The wireless communication method of claim 3, wherein
the first-type SSB is configured to be used by a first type of wireless communication device, wherein the wireless communication device is the first type of wireless communication device in a cell access procedure; and
the first system information carried in the second-type SSB is configured to be used by the first type of wireless communication device and a second type of wireless communication device in the cell access procedure.

7. The wireless communication method of claim 6, wherein
determining the reception configuration of the downlink control of the second system information comprises:
in response to determining that the offset in the first system information of the first-type SSB is a value within the first value range, determining, by the wireless communication device from the first system information in the second-type SSB, an actual amount of the subcarrier offset and the reception configuration of the downlink control of the second system information.

8. The wireless communication method of claim 6, wherein
determining the reception configuration of the downlink control of the second system information comprises:
in response to determining that the offset in the first system information of the first-type SSB is a value within the first value range,
determining, by the wireless communication device from the first system information in the second-type SSB, an actual amount of the subcarrier offset; and
determining, by the wireless communication device from the first system information in the first-type SSB, the reception configuration of the downlink control of the second system information.

9. The wireless communication method of claim 6, wherein
a first transmission time domain resource corresponding to the first-type SSB is determined based on a time domain offset relative to a second transmission time domain resource corresponding to the second-type SSB; or
the first transmission time domain resource corresponding to the first-type SSB is determined based on a frequency domain offset relative to the second transmission time domain resource corresponding to the second-type SSB.

10. The wireless communication method of claim 6, wherein an index of the first-type SSB is determined based on a virtual index and a maximum number of indexes of the second-type SSB.

11. The wireless communication method of claim 3, wherein determining the reception configuration of the downlink control of the second system information comprises:
in response to determining that the offset in the first system information of a first frequency is a value within the third value range, determining, by the wireless communication device from the first system information received in a second frequency, an amount of the subcarrier offset and the reception configuration of the downlink control of the second system information.

12. The wireless communication method of claim 11, further comprising:
   determining, by the wireless communication device, a location of the second frequency from the first system information in the first frequency.

13. The wireless communication method of claim 12, wherein one or more of an offset indication field, a control resource set field, or a search space set field of the first system information in the first frequency indicate the location of the second frequency.

14. The wireless communication method of claim 3, wherein determining the reception configuration of the downlink control of the second system information comprises:
   in response to determining that the offset in the first system information is a value within the first value range, determining, by the wireless communication device from the first system information received in a second frequency, an amount of the subcarrier offset and the reception configuration of the downlink control of the second system information.

15. The wireless communication method of claim 14, wherein one or more of a control resource set field or a search space set field of the first system information indicates the second frequency of the second system information.

16. The wireless communication method of claim 3, wherein
   the first system information received in the first-type SSB in a first frequency and the first system information received in the second-type SSB in a second frequency correspond to a same cell; and
   the downlink control of the second system information corresponding to both first-type SSB and second-type SSB have a same frequency resource.

17. The wireless communication method of claim 3, wherein
   the first system information received in the first-type SSB in a first frequency and the first system information received in the second-type SSB in a second frequency correspond to a same cell; and
   a first index of the first-type SSB and a second index of the second-type SSB are determined based on the first frequency and the second frequency.

18. A wireless communication method, comprising:
   sending, by a base station to a wireless communication device, first system information in a first-type Synchronization Signal/Physical Broadcast Channel (PBCH) Block (SSB), wherein the first system information indicates an offset, and at least two value ranges are defined for the offset;
   wherein the wireless communication device determines a reception configuration of downlink control of second system information according to one of the at least two value ranges,
   wherein the first-type SSB and a second-type SSB are located in a same frequency,
   wherein the at least two value ranges for the offset comprise a first value range indicating an undefined frequency location of another SSB associated with the second system information.

19. A wireless communication device, comprising:
   at least one processor configured to execute one or more instructions stored in a non-transitory computer readable medium to:
   receive, via a receiver from a base station, first system information in a first-type Synchronization Signal/Physical Broadcast Channel (PBCH) Block (SSB), wherein the first system information indicates an offset, and at least two value ranges are defined for the offset; and
   determine a reception configuration of downlink control of second system information according to one of the at least two value ranges,
   wherein the first-type SSB and a second-type SSB are located in a same frequency,
   wherein the at least two value ranges for the offset comprise a first value range indicating an undefined frequency location of another SSB associated with the second system information.

20. A base station, comprising:
   at least one processor configured to execute one or more instructions stored in a non-transitory computer readable medium to:
   send, via a transmitter to a wireless communication device, first system information in a first-type Synchronization Signal/Physical Broadcast Channel (PBCH) Block (SSB), wherein the first system information indicates an offset, and at least two value ranges are defined for the offset;
   wherein the wireless communication device determines a reception configuration of downlink control of second system information according to one of the at least two value ranges,
   wherein the first-type SSB and a second-type SSB are located in a same frequency,
   wherein the at least two value ranges for the offset comprise a first value range indicating an undefined frequency location of another SSB associated with the second system information.

* * * * *